(12) United States Patent
Schwartzman et al.

(10) Patent No.: US 8,402,531 B2
(45) Date of Patent: Mar. 19, 2013

(54) SELECTION OF AUTHENTICATION SERVERS BASED ON AUTHENTICATION MECHANISMS IN SUPPLICANT ATTEMPTS TO ACCESS NETWORK RESOURCES

(75) Inventors: Sharon Schwartzman, Quiryat-Mozkin (IL); Ami Schieber, Ramat-Gan (IL); Victoria Inbar, Rishon LeZion (IL)

(73) Assignee: Cisco Technology, Inc., San Jose, CA (US)

( * ) Notice: Subject to any disclaimer, the term of this patent is extended or adjusted under 35 U.S.C. 154(b) by 106 days.

(21) Appl. No.: 12/985,319

(22) Filed: Jan. 5, 2011

(65) Prior Publication Data

US 2011/0099624 A1   Apr. 28, 2011

Related U.S. Application Data

(62) Division of application No. 10/922,536, filed on Aug. 19, 2004, now Pat. No. 7,890,992.

(51) Int. Cl.
*G06F 9/00* (2006.01)
(52) U.S. Cl. ............................................. 726/15; 726/4
(58) Field of Classification Search ................... 726/15, 726/4
See application file for complete search history.

(56) References Cited

U.S. PATENT DOCUMENTS

| | | | |
|---|---|---|---|
| 5,915,095 A | 6/1999 | Miskowiec | |
| 6,061,449 A | 5/2000 | Candelore et al. | |
| 6,219,790 B1 | 4/2001 | Lloyd et al. | |
| 6,615,264 B1 | 9/2003 | Stoltz et al. | |
| 6,643,704 B1 | 11/2003 | Timms et al. | |
| 6,643,782 B1 | 11/2003 | Jin et al. | |
| 6,785,256 B2 | 8/2004 | O'Neill | |
| 6,959,336 B2 | 10/2005 | Moreh et al. | |
| 2002/0012433 A1 | 1/2002 | Haverinen et al. | |
| 2003/0115305 A1 | 6/2003 | Murray et al. | |
| 2003/0123667 A1 | 7/2003 | Weber et al. | |
| 2003/0233572 A1* | 12/2003 | Van Ackere et al. | 713/200 |
| 2004/0117653 A1* | 6/2004 | Shapira et al. | 713/201 |
| 2005/0159181 A1* | 7/2005 | Gadgil et al. | 455/554.2 |
| 2006/0143702 A1* | 6/2006 | Hisada et al. | 726/15 |

OTHER PUBLICATIONS

"Notification of Transmittal of the International Search Report and the Written Opinion of the International Search Authority, or the Declaration" received in corresponding International Application No. PCT/US05/37877.

* cited by examiner

*Primary Examiner* — Cordelia Zecher
(74) *Attorney, Agent, or Firm* — Hickman Palermo Truong Becker Bingham Wong LLP

(57) ABSTRACT

A computer-implemented method is provided for processing access requests in an AAA network. The method includes receiving an access request from a network device, identifying, based upon the access request, an authentication mechanism for facilitating AAA services for the network device and selecting, based on the identified authentication mechanism, a particular server from a plurality of servers that is compatible with the identified authentication mechanism.

20 Claims, 4 Drawing Sheets

SELECTION OF AUTHENTICATION SERVERS BASED ON AUTHENTICATION MECHANISMS IN SUPPLICANT ATTEMPTS TO ACCESS NETWORK RESOURCES

PRIORITY CLAIM; CROSS REFERENCE TO RELATED APPLICATION

This application claims the benefit and priority as a divisional under 35 U.S.C. 120 of prior application Ser. No. 10/922,536, filed Aug. 19, 2004, now U.S. Pat. No. 7,890,992 B2, issued Feb. 15, 2011, the entire contents of which is hereby incorporated by reference for all purposes as if fully set forth herein.

FIELD OF THE INVENTION

The present invention relates generally to management of computer networks. The invention relates more specifically to a method of managing supplicant attempts to access network resources in AAA networks.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Currently, a system in networking to control what resources network devices can access is called an authentication, authorization and accounting (AAA) system. In the context of AAA systems, network devices that attempt to gain access to network resources are generally referred to as "supplicants." Typically, system users cause supplicants to request access to particular resources. However, supplicants may also self-initiate access attempts for particular resources. These supplicants typically consist of laptops, desktop PCs, IP phones, VPN clients, handheld devices, and any other device that may request access to a network resource.

AAA systems include AAA clients and AAA servers. In AAA systems, supplicants typically attempt to gain access to network resources through AAA clients. AAA clients normally reside on network elements such as network access servers (NAS), routers, switches, firewalls, virtual private network (VPN) concentrators, and wireless access points (WAPs). However, AAA clients may reside on any device that facilitates access to network resources. The supplicant attempts are sent to the AAA client, which in turn generates and issues access requests to an AAA server. Typically, AAA servers handle access requests sent by AAA clients to access network resources by maintaining a database of user profiles, querying the database against access requests to verify authenticity, determining resources authorized for use, and accounting for the use of network resources. Communication between the AAA client and AAA server is facilitated via an AAA message protocol. Currently, a common AAA message protocol is Remote Authentication Dial-In User Service (RADIUS). Another AAA message protocol is the Terminal Access Controller Access Control Systems protocol (TACACS+).

Currently, AAA clients are capable of deciding which AAA server to issue access requests to on a limited basis. Specifically, conventional AAA clients are only capable of issuing access requests based on the AAA protocol that is used by a supplicant to contact the AAA client. Hence, AAA clients are only able to send authentication packets using RADIUS protocol requests to RADIUS AAA servers. Recent technologies, however, have fostered the development of various authentication mechanisms that utilize AAA protocols as carriers. These authentication mechanisms are numerous, and it is not optimal to select an AAA server based solely on the AAA protocol that is used. AAA clients currently lack the ability of deciding which AAA server to direct access requests to on a level lower than that of AAA protocols.

Also, the same problem is apparent in Virtual Private Networks (VPN). Currently, AAA clients are only capable of selecting AAA servers based on assigned user groups in VPN establishment requests. For instance, an AAA client detects a tunnel establishment request, and issues an authentication to an AAA server listed in its list of AAA server. For a certain user group, there is a specified list of AAA servers. Thus, for an AAA client to detect which list of AAA server to use the supplicant must send a specific user name or identifier to the AAA client and based on this, the AAA client decides which list of AAA server to issue the authentication request to. However, deciding which server to issue authentication requests to based on predetermined user groups is not optimal, and AAA clients currently lack the ability of deciding which AAA server to issue such requests to on a level lower than that of user groups in VPN establishment attempts.

Another issue in AAA networks is network configuration. One approach for AAA network configuration includes maintaining an AAA server in a single location to handle all requests for all AAA protocols, e.g., either RADIUS or TACACS+. If the network topology includes AAA clients located in remote branch offices, such clients may need to forward access requests to the AAA server over the wide area network (WAN).

This approach has numerous disadvantages. One scenario where these disadvantages are exploited is when the link between a branch office and the full-scale AAA server is disrupted. The AAA client in the branch office is unable to forward access requests to the AAA server, and users requiring authentication are not serviced and the branch of supplicants associated with the AAA client become dysfunctional.

Another disadvantage is that maintaining a single AAA server for every authentication mechanism associated with an AAA protocol creates large administration and maintenance overheads. Also, the database of all users in the entire enterprise is kept by the full-scale AAA servers and managed by those servers, which increases management costs associated with the AAA servers. Moreover, the abundance of different authentication mechanisms generates more traffic between supplicants, AAA clients and AAA servers than other more common mechanisms. This traffic generates large amount of load on WAN links and full-scale AAA servers.

Another approach is to have an AAA client use a full-scale backup AAA server in the remote branch office. However, this approach also carries the high maintenance, management and administration costs associated with keeping a full scale AAA server at the branch location. Moreover, if the link between the branch office and the full-scale backup server is disrupted, the local area network (LAN) traffic will flood the backup full scale AAA server in the remote branch office, and subsequently generate a large amount of load on the LAN.

Another approach is for the AAA client itself to hold identity data related to supplicants. The disadvantages with this approach are the maintenance and administration costs of configuring each supplicant's user's details on each and every AAA client and the lack of scalability for large AAA networks.

Therefore, it is desirable to keep a local AAA server within a remote branch office to process certain authentication requests when the branch is disconnected from the central, full scale AAA server. However, this is helpful only if the AAA client can differentiate among different types of authentication mechanisms and select either the local or full-scale AAA servers based on those authentication mechanisms.

Therefore, based on the foregoing, there is a clear need for a method of managing AAA network configurations that does not suffer from the limitations of prior approaches.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
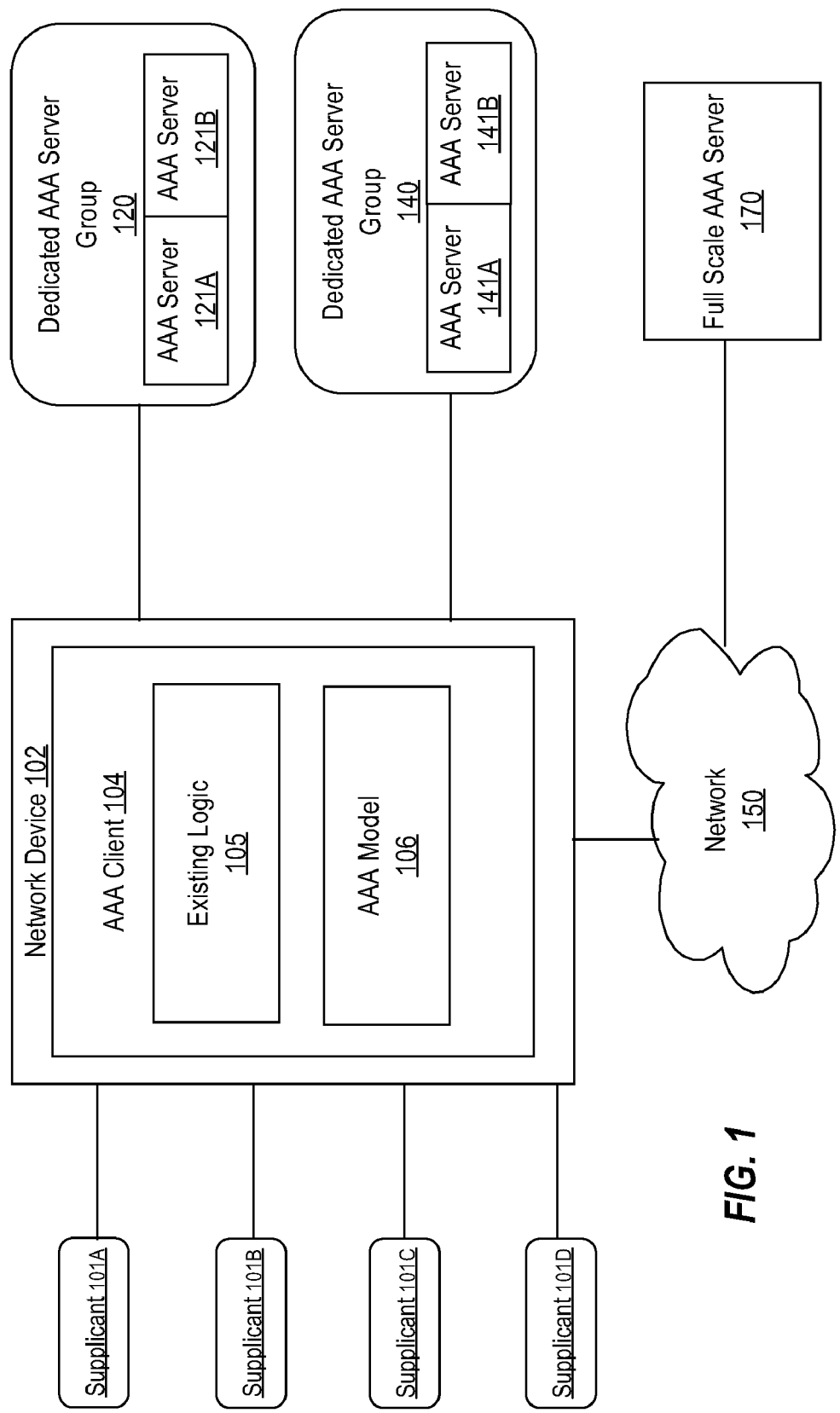
FIG. 1 is a block diagram that illustrates a general overview of one embodiment of an AAA network.

A method and apparatus for selection of authentication servers based on the authentication mechanisms specified or indicated in supplicant access requests is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 AAA Network for Processing Access Requests of Supplicants
3.0 Selecting AAA Servers Based on Authentication Mechanisms Used by a Supplicant
   3.1 Associating authentication mechanisms with AAA servers
      3.1.1 An example of Associating authentication servers with authentication mechanism identifiers using CLI Commands
   3.2 Identifying the authentication mechanism of the supplicant
   3.3 Selecting an AAA server and issuing an access request to the AAA server
4.0 Implementation Mechanisms
5.0 Extensions and Alternatives
1.0 General Overview According to one aspect, a computer-implemented method is provided for processing supplicant attempts to access a network resource. The method includes detecting the supplicant's attempt to access a network resource, identifying, based upon the supplicant's attempt, an authentication mechanism for facilitating AAA services for the supplicant and selecting, based on the identified authentication mechanism, a particular server from a plurality of servers that is compatible with the identified authentication mechanism.

In other aspects, the method includes detecting the supplicant's attempt to access a network resource, identifying, based upon the supplicant's attempt, a VPN tunnel type used in establishing a VPN, wherein the VPN utilizes AAA services with respect to the supplicant and selecting, based on the identified VPN tunnel type, a particular server from a plurality of servers that is compatible with the identified VPN tunnel type.

In a related feature, the steps of identifying the authentication mechanism and selecting a particular server that is compatible with the identified authentication mechanism are performed by an AAA Client. In another related feature, the steps of identifying the VPN tunnel type and selecting a particular server that is compatible with the identified VPN tunnel type are performed by an AAA client. Also, in a related feature, the AAA Client is implemented by logic on a network element. In another feature, the method includes, based on the supplicant's attempt to access a network resource, causing the AAA client to issue an access request to a particular server.

In a related feature, the method includes detecting a supplicant's attempt to access a network resource originates from within a Local Area Network (LAN). Also, in another feature, the method includes detecting that the supplicant's attempt to access a network resource is communicated wirelessly.

In another feature, the method includes generating association data that specifies relationships between authentication mechanisms and servers, and selecting a particular server from a plurality of servers based on both the identified authentication mechanism and the association data. Also, in a related feature, the method includes generating association data that specifies relationships between VPN tunnel types and servers, and selecting a particular server from a plurality of servers based on both the identified VPN tunnel type and the association data. In a related feature, the generating of association data includes generating an AAA model in response to receiving command line interface (CLI) commands.

In a related feature, the identified authentication mechanism is an Extensible Authentication Protocol (EAP) method, and selecting a particular server from a plurality of servers based on both the identified authentication mechanism and that the particular server supports the EAP method.

In another feature, the method includes generating association data that associates one or more VPN tunnel types or authentication mechanisms with a particular server from a plurality of servers, based, at least in part, that the particular server supports a specified level of service.

In a related feature, the method includes generating association data that associates one or more VPN tunnel types or authentication mechanisms with a particular server from a plurality of servers, based, at least in part, that the particular server is configured as a dedicated server for a particular one or more VPN tunnel types or authentication mechanisms.

Also, in another related feature, the method includes generating association data that associates a particular server with one or more VPN tunnel types or authentication mechanisms based, at least in part, on the physical location of the particular server.

In other aspects, a computer apparatus and a computer-readable medium are configured to carry out the aforementioned steps.

2.0 AAA Network for Processing Access Requests of Supplicants

FIG. 1 is a block diagram depicting a general overview of one embodiment of an AAA network. Each supplicant, 101A-101D, may be any device that attempts to gain access to a network resource, including but not limited to handheld devices, laptops, desktop PCs, IP phones and VPN clients. Each supplicant, 101A-101D, is communicatively coupled to network device 102. In one embodiment, the communication occurs over a wireless network. In other embodiments, the communication between supplicants 101A-101D and network device 102 may occur over an Ethernet cable or through any other means of communication. In various embodiments, network device 102 may be a wireless access point, a virtual private network device, a network access server, a switch, router or any other appropriate device. Network device 102 contains AAA Client 104. The Existing Logic 105 on the AAA Client 104 may be used to identify the authentication mechanism used in a supplicant's 101A-101D attempt to access network resources. Also, in one embodiment the AAA Client 104 contains an AAA Model 106. In one embodiment, the AAA Model 106 includes CLI command syntax for associating one or more authentication mechanism identifiers with one or more servers that are respectively associated with one or more authentication mechanisms. Furthermore, the network device 102 is communicatively coupled to Dedicated AAA Server Groups 120 and 140 and Network 150. In one embodiment, network device 102 is communicatively coupled to full scale AAA Server 170 through Network 150. In other embodiments, network device 102 may be communicatively coupled to full scale AAA Server 170 through a LAN.

Consider this example of a functioning system of FIG. 1. When a particular supplicant 101A first attempts to access a network resource, the supplicant 101A communicates its attempt through the AAA Client 104. In one embodiment, using Existing Logic 105, the AAA Client 104 detects the attempt and identifies which authentication mechanism is being used in the supplicant's 101A attempt. For example, Supplicant 101A may be using the EAP-FAST authentication mechanism under the Extensible Authentication Protocol (EAP). Additional, supplicants 101B-101D may use other mechanisms. For example, supplicant 101B may be using EAP-MSCHAP-V2 under EAP. In another embodiment, the AAA Client 104 identifies a particular VPN tunnel type attempting to be established by the supplicant, For instance, supplicant 101C may be using a particular VPN tunnel type, such as IPSec or L2TP for a VPN establishment request. Finally, supplicant 101D may be using any other current or later developed authentication mechanism.

Next, the AAA Client 104 uses an AAA Model 106 to select one or more servers that are respectively associated with the authentication mechanism or VPN tunnel type being used in the supplicant's attempt to access network resources. In one embodiment, the AAA Model 106 may include CLI commands as described in section 3.1.1. For example, the AAA Model 106 may indicate that supplicant attempts utilizing the EAP-FAST authentication mechanism are to be issued to any one of the servers in Dedicated AAA Server Group 120. Alternatively, in another embodiment, the AAA Model 106 may indicate that supplicant attempts utilizing the EAP-FAST authentication mechanism are to be issued to a particular AAA Server 121A in the Dedicated AAA Server Group 120. In this embodiment, the AAA Client 104 selects the appropriate Server Group 120 to issue access requests to base on supplicant 101A's attempt, which is using the EAP-FAST authentication mechanism. In another embodiment, the AAA Model indicates that only supplicant attempts utilizing an IPSec VPN tunnel type will be forwarded to Dedicated Server Group 140, and that all other access requests will be forwarded to Full Scale AAA Server 170 through Network 150. Alternatively, in another embodiment, the AAA Client may set the Full Scale AAA Server 170 as the default server, and only forward specific authentication mechanisms to Dedicated AAA Servers 120 and 140 as indicated by the AAA Model.

In one embodiment, after selecting the appropriate server, AAA Client 104 issues an access request for supplicants 101A-101D to Dedicated AAA Server Group 120 or 140, or alternatively, Full Scale AAA Server 170 over Network 150. Alternatively, Full Scale AAA Server 170 may be in the same LAN as Dedicated AAA Server Groups 120 and 140, supplicants 101A-101D, or Network Device 102. Alternatively, all the devices in FIG. 1 may be located in the same LAN.

3.0 Selecting AAA Servers Based on Authentication Mechanisms Used by a Supplicant.

Figure 2:
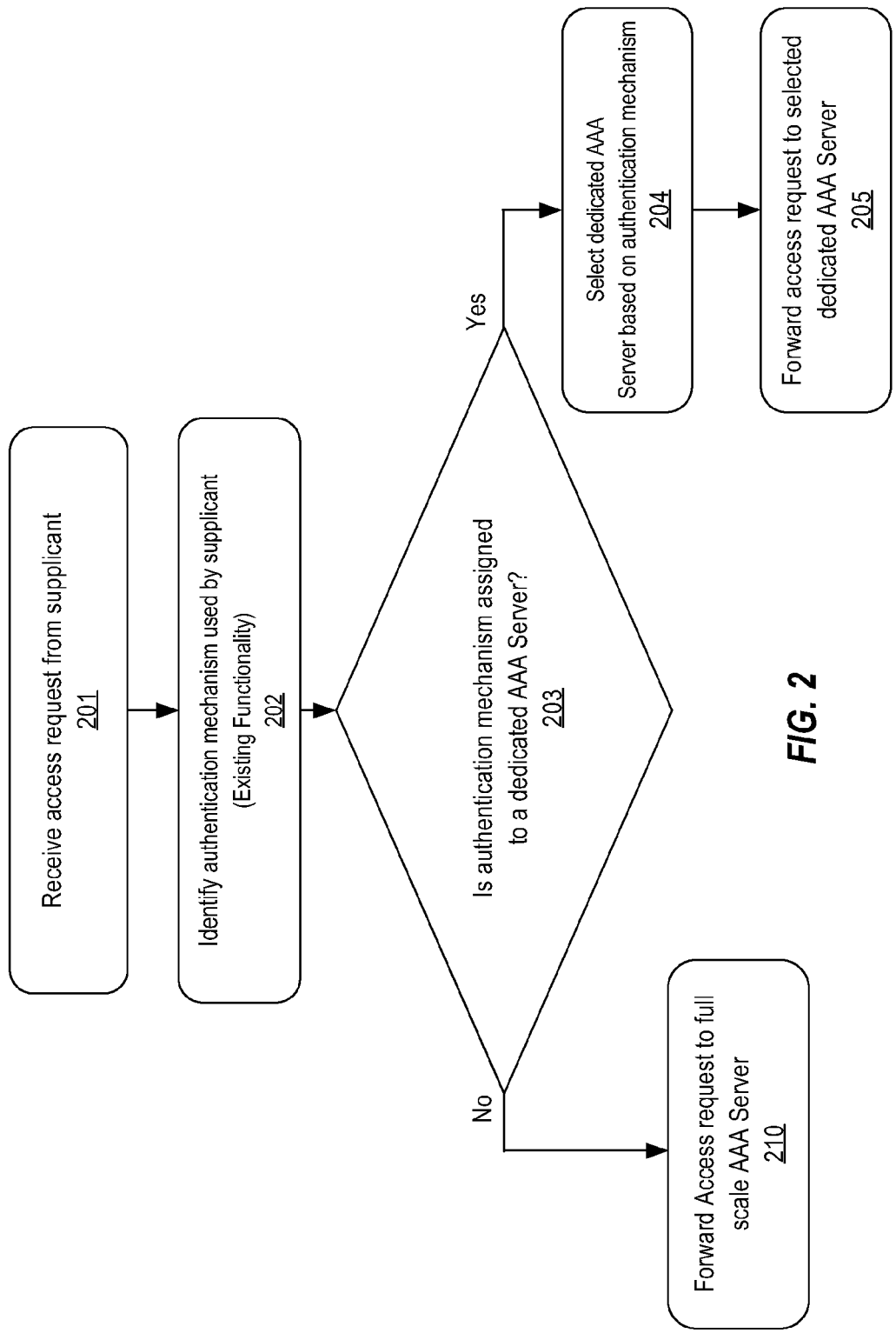
FIG. 2 is a flow diagram generally depicting a method of selecting one or more AAA servers based on one or more authentication mechanisms for use in authenticating a supplicant.

FIG. 2 is a flow diagram generally depicting an approach for selecting one or more AAA servers based on one or more authentication mechanisms for use in authenticating a supplicant. In step 201, an attempt to access a network resource is received from the supplicant. The attempt may be communicated via an Ethernet connection, a wireless connection, or any other appropriate means. In step 202, the specific authentication mechanism used by the supplicant is identified, for example, by Existing Logic 105 on the AAA Client 104. Also, in another embodiment, the supplicant may be attempting to establish a VPN tunnel, and in step 202, the specific VPN tunnel type used by the supplicant is identified by Existing Logic 105 on the AAA Client 104. In essence, identifying the particular authentication mechanism or VPN tunnel type in used in a supplicant's attempt to access a network resource is a functionality that is currently available on network elements and is accomplished using various methods.

With this information, in step 203, a determination is made whether the specific authentication mechanism or VPN tunnel type has been assigned to a dedicated AAA Server. In one embodiment, this is done through AAA Model 106 expressed in CLI commands. The AAA Model 106 may indicate whether one or more authentication mechanisms are associated with one or more dedicated AAA Servers. Alternatively, the AAA Model 106 may indicate that all authentication mechanisms should be associated with Full Scale AAA Server 170 unless otherwise specified. In step 204, if the AAA Model 106 indicates that a certain authentication mechanism or VPN tunnel type is associated with a particular one or more dedicated AAA Servers, then a particular one or more dedicated AAA Servers are selected based on the authentication mechanism or VPN tunnel type. An access request is then issued to the selected one or more dedicated AAA Servers. In one embodiment, if the specific authentication mechanism or VPN tunnel type is not assigned to a dedicated AAA Server, then, in step 210, the access request is forwarded to the full scale AAA Server 170. The full scale AAA Server 170 may be located over a network, or in the same LAN as the supplicant, AAA Client or dedicated AAA Servers.

3.1 Associating Authentication Mechanisms with AAA Servers

Figure 3:
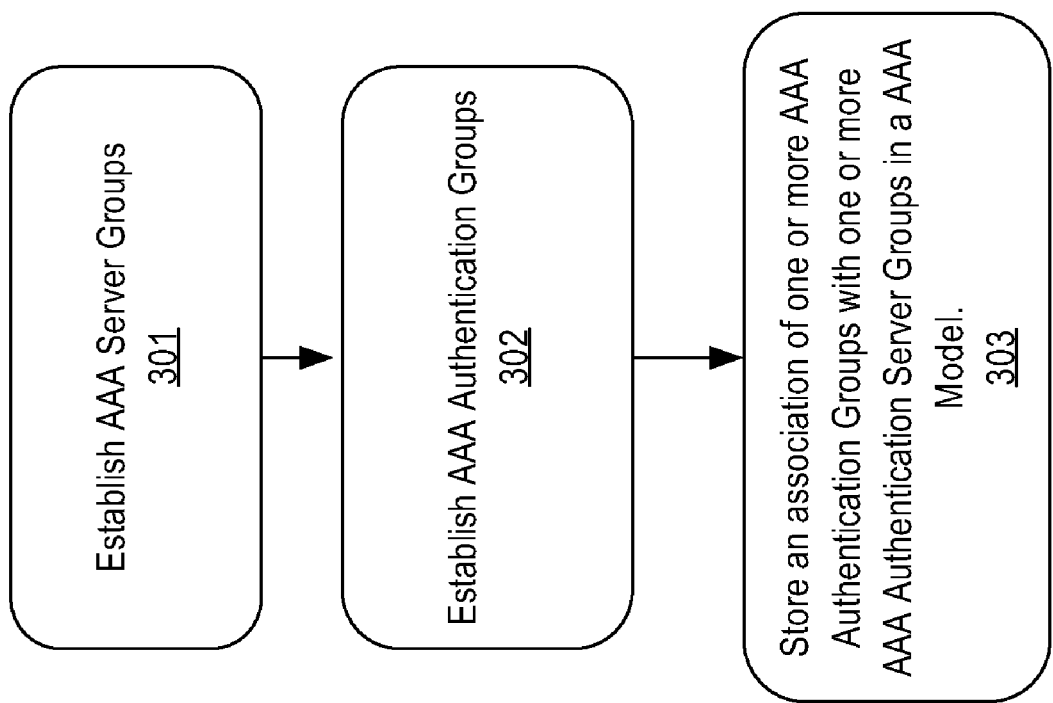
FIG. 3 is a flow diagram depicting one embodiment of a method for associating one or more AAA Servers with one or more authentication mechanisms for use in authenticating a supplicant.

FIG. 3 depicts one embodiment of a method for associating one or more AAA Servers with one or more authentication mechanisms for use in authenticating a supplicant. In step 301, AAA Server Groups are established, which may involve grouping one or more servers together based on a common characteristic, such as the ability to handle TACACS+ authentication requests. Alternatively, a Server Group may contain a number of servers capable of handling RADIUS and DIAMETER authentication requests. Moreover, one or more servers may be grouped based on their ability to handle EAP requests. In another embodiment, one or more servers may be grouped based on their ability to handle particular VPN tunnel types. Alternatively, an AAA Server Group may be created for a specific authentication mechanism. In one embodiment, the AAA Server Group may include one server for a specific authentication mechanism.

In step 302, an AAA Authentication Group is established. In one embodiment, establishing an AAA Authentication Group may involve grouping authentication mechanisms together based on a common protocol, such as EAP. Also, in another embodiment, establishing an AAA Authentication Group may involve grouping VPN tunnel types. Alternatively, authentication mechanisms may be grouped together based on any common characteristic. Also, in one embodiment, an AAA Authentication Group may include one authentication mechanism.

In step 303, the AAA Client 104 stores an association of one or more authentication mechanism groups with one or more authentication server Groups in the AAA Model 106. In one embodiment, the AAA Model 106 may be implemented through CLI commands. However, the AAA Model may be implemented through any appropriate interface, and the example using CLI commands in TABLES 1-5 is in no way meant to limit the implementation of the AAA Model to CLI commands only. Thus, a person of ordinary skill in the art would recognize that the AAA Model could be implemented in many different ways.

One example of the function of the AAA Model 106 is to associate Server Groups that can handle EAP requests with the authentication group of EAP requests. In another embodiment, the AAA Model 106 may associate authentication groups using VPN services with Server Groups that can handle VPN Requests. The examples above are only particular embodiments of the invention, and the AAA Model may establish associations based on other factors.

3.1.1 An Example of Associating Authentication Servers with Authentication Mechanism Identifiers Using CLI Commands As described above, in one embodiment, associating authentication mechanisms with AAA servers may be done using CLI commands as depicted in TABLES 1-5 hereinafter. TABLE 1 represents a list of AAA Servers that may be assigned to one or more groups of AAA Server Groups.

TABLE 1

AAA Server host 1.1.1.1
AAA Server host 2.2.2.2
AAA Server host 3.3.3.3
AAA Server host 4.4.4.4

Various AAA server characteristics may be set for each server in the Server Groups. Thus, for each AAA Server host in TABLE 1, AAA server characteristics may be specified using CLI commands. In one embodiment, the AAA server characteristics are those available in devices using Cisco's Internetwork Operating System (Cisco IOS). An example of AAA authentication characteristics in Cisco IOS devices is represented in TABLE 2.

TABLE 2

| | |
|---|---|
| attribute | Customize selected radius attributes |
| authorization | Authorization processing information |
| challenge-noecho | Data echoing to screen is disabled during Access-Challenge |

TABLE 2-continued

| | |
|---|---|
| configure-nas | Attempt to upload static routes and IP pools at startup |
| deadtime | Time to stop using a server that doesn't respond |
| directed-request | Allow user to specify radius server to use with '@ server' |
| domain-stripping | Strip the domain from the username |
| host | Specify a RADIUS server |
| key | Encryption key shared with the RADIUS server |
| optional-passwords | The first RADIUS request can be made without requesting a password. |
| retransmit | specify the number of retries to active server |
| retry | Specify how the next packet is sent after timeout |
| timeout | Time to wait for a RADIUS server to reply |
| transaction | Specify per-transaction parameters |
| unique-ident | Higher order bits of Acct-Session-Id |
| vsa | Vendor specific attribute configuration |

TABLE 3 represents a list of AAA authentication mechanisms that may be assigned to one or more groups of AAA Authentication Groups.

TABLE 3 authentication mechanism dot1x
authentication mechanism ppp
authentication mechanism login
authentication mechanism IPSec
authentication mechanism PPTP
authentication mechanism L2TP
authentication mechanism L2F Various authentication characteristics may be set on a Network device containing an AAA Client. An example of authentication characteristics in Cisco IOS devices is represented in TABLE 4.

TABLE 4

| | |
|---|---|
| arap | Set authentication lists for arap |
| attempts | set the maximum number of authentication attempts |
| banner | Message to use when starting login/authentication |
| nasi | Set authentication lists for NASI |
| enable | set authentication list for enable |
| fail-message | Message to use for failed login/authentication |
| login | Set authentication lists for logins |
| password-prompt | Test to use when prompting for a password |
| ppp | Set authentication lists for ppp |
| sgbp | Set authentication lists for sgbp |
| username-prompt | Test to use when prompting for a username |

TABLE 5 represents an association of one or more AAA Servers with one or more authentication mechanism identifiers using CLI command syntax.

TABLE 5

AAA Server group A Type Radius Tacacs+

AAA Server host 1.1.1.1 auth-port 1812 acct-port 1813
AAA Server host 2.2.2.2 auth-port 1812 acct-port 1813
AAA Server key cisco456
AAA Server retransmit 3
AAA Server timeout 30
AAA Server group B Type Diameter Tacacs+

AAA Server host 3.3.3.3
AAA Server host 4.4.4.4
AAA Server key cisco123
AAA Server retransmit 3
AAA Server timeout 30
AAA Server group C Type Radius AAA Server host 5.5.5.5
AAA Server key cisco789

TABLE 5-continued

```
AAA Server retransmit 2
AAA Server timeout 60
AAA authentication group X authentication mechanism dot1x
authentication mechanism login
AAA authentication group Y authentication mechanism IPSec
authentication mechanism ppp
AAA authentication group Z authentication mechanism RSA Public Key
AAA model AAA authentication X A
AAA authentication Y B
AAA authentication X B
AAA authentication Y A
AAA authentication Z C
```

The CLI command syntax in TABLE 5 is one example of many possible combinations according to which an AAA Client 104 could base its authentication decisions. For example, when "AAA authentication X A" is set under the AAA Model 106, the AAA Client 104 uses dedicated servers 1.1.1.1 and 2.2.2.2 to authenticate supplicants using dot1x and login authentication requests. Similarly, when "AAA authentication Y B" is set under the AAA Model 106, the AAA Client 104 uses dedicated servers 3.3.3.3 and 4.4.4.4 to authenticate supplicants using IPSec and ppp authentication requests. Moreover, the CLI command syntax in TABLE 5 demonstrates how server characteristics may be set for each server or server group. For example, a server key, authorization port and accounting port are specified for servers 1.1.1.1 and 2.2.2.2 in Server Group A, while only a key is set for servers 3.3.3.3 and 4.4.4.4 in Server Group B.

3.2 Identifying the Authentication Mechanism of the Supplicant

AAA clients are currently capable of differentiating between authentication mechanisms used by different protocols. For instance, network devices, such as network device 102, have the ability to differentiate between the different protocols and authentication mechanisms used by supplicants 101A-101D. In one embodiment, the network device 102 can differentiate between different EAP methods in a wireless environment. For instance, a wireless access point may determine that a message received from a supplicant is an EAP Identity Response, a LEAP challenge response or LEAP client challenge by examining EAPOL packets received from the supplicant. Also, the AAA Client is also capable of identifying different VPN tunnel types used by supplicants in VPN establishment attempts. For instance, a supplicant may be attempting to establish an IPSEC, L2TP or any other VPN tunnel type, and the AAA client may identify the particular tunnel type attempting to be established by examining data packets. In other embodiments, such information may be identified by any appropriate method currently used or later developed.

Thus, for different protocols and devices, the identification and differentiation of authentication protocols or VPN tunnel types may be accomplished in many ways. However, the present disclosure enables AAA clients to now use this existing information to select AAA servers.

3.3 Selecting an AAA Server and Issuing an Access Request to the AAA Server

After retrieving the information identifying the authentication mechanism or VPN tunnel type used in a supplicant's attempt to access a network resource, AAA Client 104 selects one or more AAA servers and issues an access request to one of the AAA servers. Thus, in a particular embodiment, after determining that a supplicant's request is using the RSA Public Key authentication mechanism, the AAA Client 104 identifies which AAA authentication group the RSA Public Key authentication mechanism belongs to. Performing a lookup in Table 5, the AAA Client 104 may determine that the RSA Public Key authentication mechanism belongs to AAA authentication group Z. The AAA Client 104 may also determine which AAA authentication group a particular authentication mechanism belongs to by examining any type of data storage structure.

After identifying the particular AAA authentication group, the AAA Client 104 identifies one or more AAA server groups that have been associated with the AAA authentication group. In one embodiment, the AAA Client 104 checks the AAA Model 106, which may contain an association of one or more AAA authentication groups with one or more AAA server groups. For example, in this particular embodiment, the AAA Model 106 in TABLE 5 indicates that AAA authentication group Z is associated with AAA server group C. AAA server group C contains one server, 5.5.5.5. Therefore, after examining the AAA Model 106, the AAA Client 104 selects server host 5.5.5.5 for issuing the access request using the RSA Public Key authentication mechanism.

In other embodiments, the AAA Client 104 may determine that a particular authentication mechanism belongs to AAA authentication group X, as represented in TABLE 5. After checking the AAA Model 106, the AAA Client 104 may identify that AAA authentication group X is associated with both AAA Server groups A and B. Therefore, the AAA Client 104 may determine that the particular authentication mechanism may be forwarded to any of the server hosts in AAA Server groups A and B, more specifically, server hosts 1.1.1.1, 2.2.2.2, 3.3.3.3 or 4.4.4.4. Therefore, the AAA Client 104 may select any of the server hosts in AAA Server groups A and B to issue the particular access request to. Alternatively, AAA Client 104 may further limit this selection by identifying the level of service requested by the supplicant's access request. Thus, if the AAA Client 104 determines a particular access request is to be handled with high priority, the AAA Client 104 may further identify a particular server in AAA Server Groups A and B that can process the access request in the least time. Additionally, the AAA Client 104 may select an AAA Server or AAA Server group based in part on network bandwidth data, server response time, and whether a particular AAA server or AAA server group is located within the same LAN as the network device or the AAA Client 104. Also, in addition to the association made in the AAA Model 106, the AAA Client 104 may select an AAA Server or AAA Server group based on any other additional factor.

After selecting the particular AAA server to issue the supplicant's access request to, the AAA Client 104 causes the network device 102 to issue the access request to the selected server. In other embodiments, the AAA Client 104 may cause the access request to be issued to the selected server through any device that facilitates communication between supplicants 101A-101D and the selected AAA server.

4.0 Implementation Mechanisms

Figure 4:
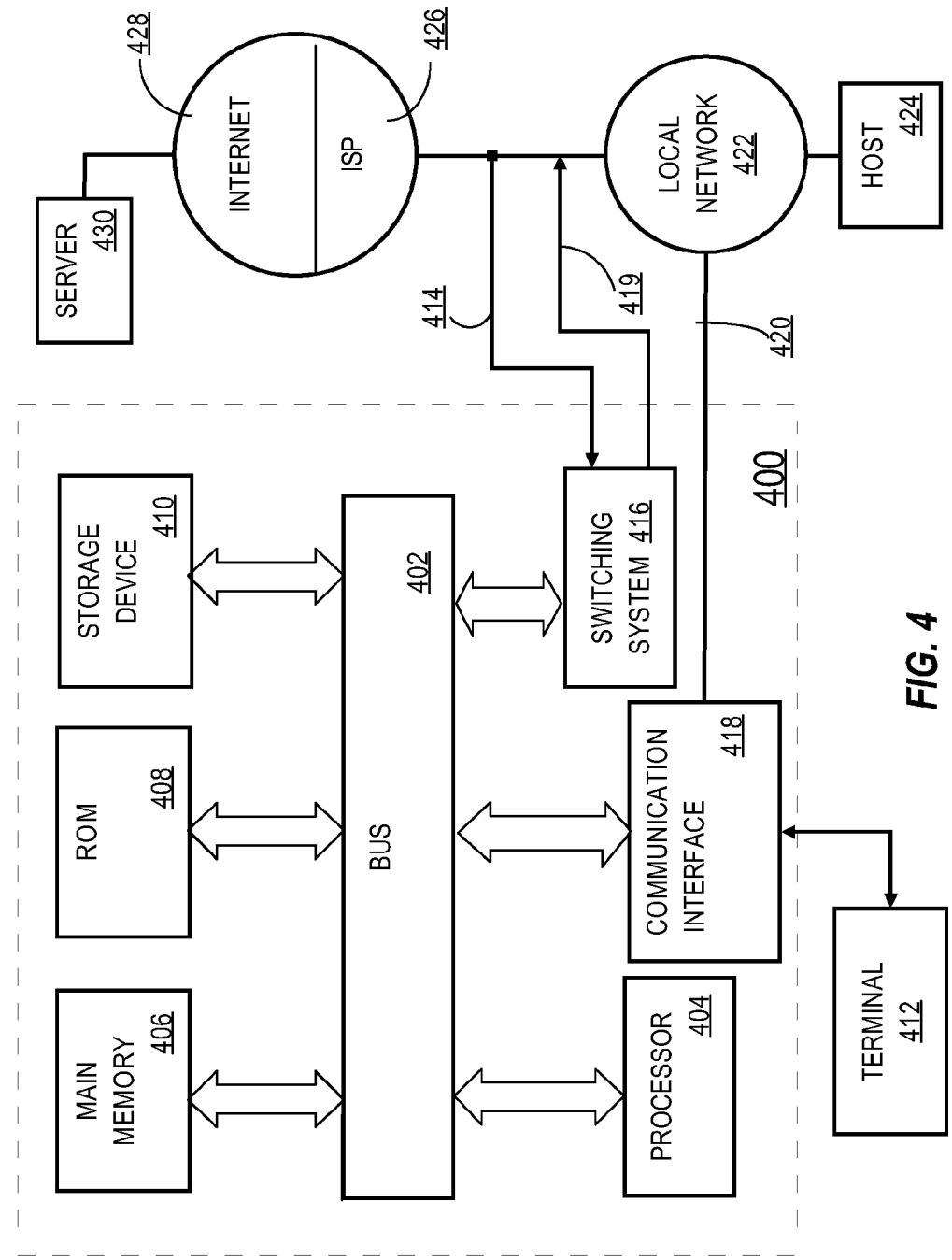
FIG. 4 is a block diagram that illustrates a computer system upon which an embodiment may be implemented.

FIG. 4 is a block diagram that illustrates an example computer system 400 upon which an embodiment of the invention may be implemented. Embodiments may be implemented using one or more computer programs running on a network element such as a router device.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for selecting one or more authentication servers based on the authentication mechanisms in supplicant access requests. According to one embodiment of the invention, the selection of one or more authentication servers based on the authentication mechanisms in supplicant access requests is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media may also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for the selection of authentication servers based on authentication mechanisms in supplicant access requests as described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense

What is claimed is:

1. A method for processing a supplicant's attempt to access a network resource comprising:
    detecting the supplicant's attempt to access a network resource;
    identifying, based upon the supplicant's attempt, a Virtual Private Network (VPN) tunnel type, indicating one of a plurality of tunneling protocols, and used in establishing a VPN, wherein the VPN utilizes authentication, authorization or accounting (AAA) services with respect to the supplicant;
    selecting, based on the identified VPN tunnel type included in the supplicant's attempt, a particular AAA server from a plurality of servers that is compatible with the identified VPN tunnel type;
    wherein the method is performed by one or more processors.

2. The method as recited in claim 1, wherein the identifying and selecting are performed by an AAA client.

3. The method as recited in claim 2, wherein the AAA client is implemented by logic on a network element.

4. The method as recited in claim 2, wherein, based on the supplicant's attempt to access a network resource, the AAA client issues an access request to a particular server.

5. The method as recited in claim 1, wherein detecting a supplicant's attempt to access a network resource includes detecting that the supplicant's attempt to access a network resource originates from within a Local Area Network (LAN).

6. The method as recited in claim 1, wherein detecting a supplicant's attempt to access a network resource includes detecting that the supplicant's attempt to access a network resource is communicated wirelessly.

7. The method as recited in claim 1, further comprising generating association data that specifies relationships between VPN tunnel types and servers; selecting, based on both the identified VPN tunnel type and the association data, a particular server from the plurality of servers that is compatible with the identified VPN tunnel type.

8. The method as recited in claim 7, further comprising generating an AAA model in response to receiving command line interface (CLI) commands.

9. The method as recited in claim 7, wherein generating association data that specifies relationships between VPN tunnel types and servers includes generating association data that associates one or more VPN tunnel types with the particular server from the plurality of servers, based, at least in part, that the particular server supports a specified level of service.

10. The method as recited in claim 7, wherein generating association data that specifies relationships between VPN tunnel types and servers includes generating association data that associates one or more VPN tunnel type with the particular server from the plurality of servers, based, at least in part, that the particular server is configured as a dedicated server for a particular one or more VPN tunnel types.

11. The method as recited in claim 7, wherein generating association data that specifies relationships between VPN tunnel types and servers includes generating association data that associates the particular server with one or more VPN tunnel types based, at least in part, on a physical location of the particular server.

12. A method for processing a supplicant's attempt to access a network resource comprising:
    detecting the supplicant's attempt to access a network resource;
    identifying, based upon the supplicant's attempt, a VPN tunnel type, indicating one of a plurality of tunneling protocols, and used in establishing a VPN, wherein the VPN utilizes AAA services with respect to the supplicant;
    generating association data that specifies relationships between VPN tunnel types and servers;
    examining the association data to determine one or more servers that are compatible with the identified VPN tunnel type;
    selecting, based on both the identified VPN tunnel type, included in the supplicant's attempt, and the association data, a particular AAA server from a plurality of servers that is compatible with the identified VPN tunnel type;
    based on the supplicant's attempt causing an access request to be issued to a particular server.

13. The method as recited in claim 12, wherein generating association data that specifies relationships between VPN tunnel types and servers comprises generating association data that associates one or more VPN tunnel types with the particular server from the plurality of servers, based, at least in part, that the particular server supports a specified level of service.

14. The method as recited in claim 12, wherein generating association data that specifies relationships between VPN tunnel types and servers comprises generating association data that associates one or more VPN tunnel type with the particular server from the plurality of servers, based, at least in part, that the particular server is configured as a dedicated server for a particular one or more VPN tunnel types.

15. The method as recited in claim 12, wherein generating association data that specifies relationships between VPN tunnel types and servers comprises generating association data that associates the particular server with one or more VPN tunnel types based, at least in part, on a physical location of the particular server.

16. The method as recited in claim 12, wherein the identifying and selecting are performed by an AAA client; wherein the AAA client is implemented by logic on a network element; wherein based on the supplicant's attempt to access a network resource, the AAA client issues an access request to the particular server.

17. A non-transitory computer-readable storage medium storing one or more sequences of instructions which, when executed by one or more processors, cause the one or more processors to perform:
    detecting the supplicant's attempt to access a network resource;
    identifying, based upon the supplicant's attempt, a VPN tunnel type, indicating one of a plurality of tunneling protocols, and used in establishing a VPN, wherein the VPN utilizes AAA services with respect to the supplicant;
    generating association data that specifies relationships between VPN tunnel types and servers;

examining the association data to determine one or more servers that are compatible with the identified VPN tunnel type;

selecting, based on both the identified VPN tunnel type, included in the supplicant's attempt, and the association data, a particular AAA server from a plurality of servers that is compatible with the identified VPN tunnel type;

based on the supplicant's attempt causing an access request to be issued to a particular server.

18. The non-transitory computer-readable storage medium as recited in claim 17, further comprising instructions which, when executed, cause the one or more processors to perform: generating association data that associates one or more VPN tunnel types with the particular server from the plurality of servers, based, at least in part, that the particular server supports a specified level of service.

19. The non-transitory computer-readable storage medium as recited in claim 17, further comprising instructions which, when executed, cause the one or more processors to perform: generating association data that associates one or more VPN tunnel type with the particular server from the plurality of servers, based, at least in part, that the particular server is configured as a dedicated server for a particular one or more VPN tunnel types.

20. The non-transitory computer-readable storage medium as recited in claim 17, further comprising instructions which, when executed, cause the one or more processors to perform: generating association data that associates the particular server with one or more VPN tunnel types based, at least in part, on a physical location of the particular server.

* * * * *